H. G. HADDEN, Jr.
Improvement in Wagon-Brakes.

No. 126,201. Patented April 30, 1872.

UNITED STATES PATENT OFFICE.

HENRY G. HADDEN, JR., OF CATSKILL, NEW YORK.

IMPROVEMENT IN WAGON-BRAKES.

Specification forming part of Letters Patent No. 126,201, dated April 30, 1872.

Specification describing a new and useful Improvement in Wagon-Brakes, invented by HENRY G. HADDEN, Jr., of Catskill, in the county of Greene and State of New York.

Figure 1:
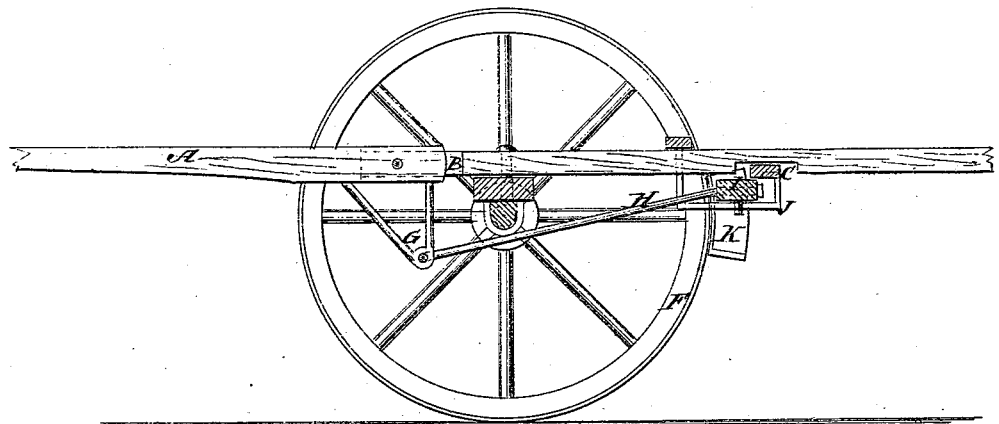
Figure 2:
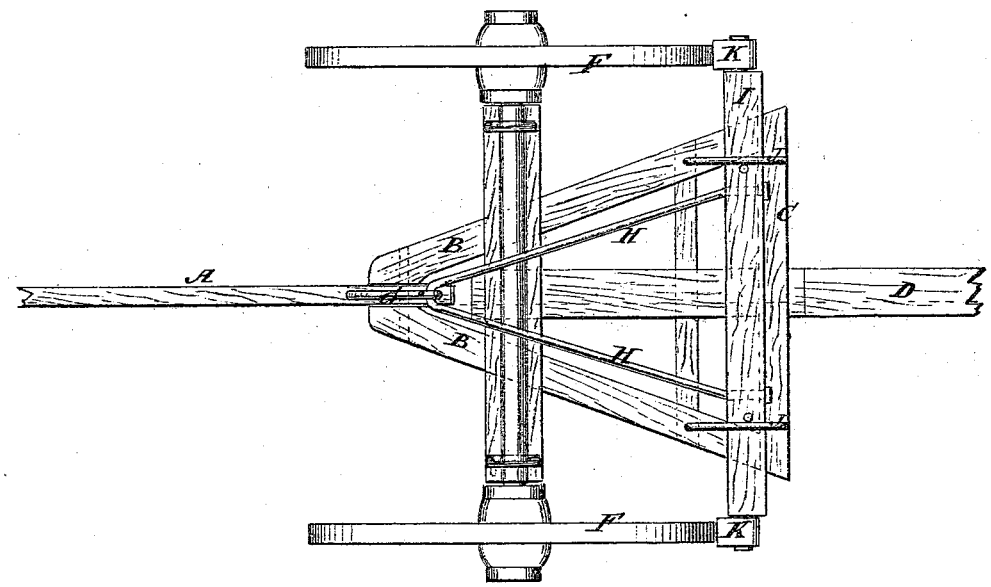

Figure 1 is a detail vertical section of the forward part of the running-gear of a wagon. Fig. 2 is an under-side view of the same.

Similar letters of reference indicate corresponding parts.

The invention relates to that class of wagon-brakes which are applied whenever the horses are held back; and consists in the improved means hereinafter fully described, and subsequently pointed out in the claim.

A is the tongue. B are the hounds. C is the sway-bar. D is the reach. E is the forward axle, and F are the forward wheels, about the construction of all of which parts there is nothing new. To the rear part of the under side of the tongue A is rigidly attached a downwardly-projecting arm, G, about twelve inches, more or less, in length. To the lower end of the arm G is pivoted the forward ends of the rods H, which incline from each other and pass back beneath the forward axle E, and their rear ends are attached to the brake-bar I. The brake-bar I is supported by and moves forward and back in keepers J, attached to the sway-bar C and hounds B, and which is kept from longitudinal movement by guide-pins attached to it, and which strike against the keepers J, as shown in Figs. 1 and 2. To the ends of the brake-bar I are pivoted or otherwise attached the brake-shoes K, which bear against the rims of the forward wheels F, and thus check the advance of the wagon. The brake-shoes K should be so arranged that when the wheels turn backward the friction of the wheels will tend to throw them off, so that the wagon may be backed without applying the brakes. When the wagon is moving forward, and the horses or horse begins to hold back, the forward end of the tongue or shafts is raised. The elevation of the forward end of the tongue or shafts by means of the arm G and rods H draws the brake-bar I forward in the keepers J, and applies the brake-shoes K to the rims of the forward wheels F.

This construction of the brake makes it automatic in its operation, and, at the same time, prevents it from interfering in the least with the ordinary movements of the wagon.

If desired, the brake-bar I may be connected with the rear part of the running gearing of the wagon, provided the rigid arm G and rods H are so arranged that the brake-bar I may be operated to apply the brake by the upward movement of the tongue or shafts.

Having thus described my invention, I claim as new and desire to secure by Letters Patent—

The combination, with a tongue, A, and brake-bar I, of the arm G provided with the jointed (and bent in opposite directions) rods H, arranged on the wagon, as and for the purpose described.

HENRY GRIFFIN HADDEN, JR.

Witnesses:
A. LEWIS HADDEN,
RUFUS H. KING.